UNITED STATES PATENT OFFICE.

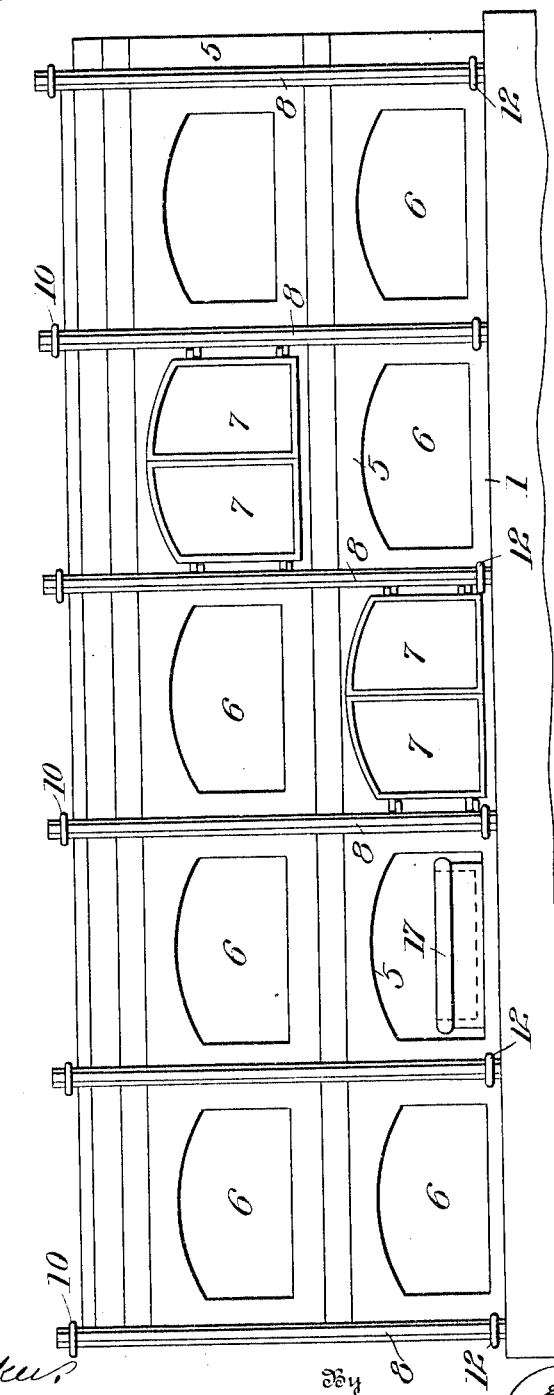

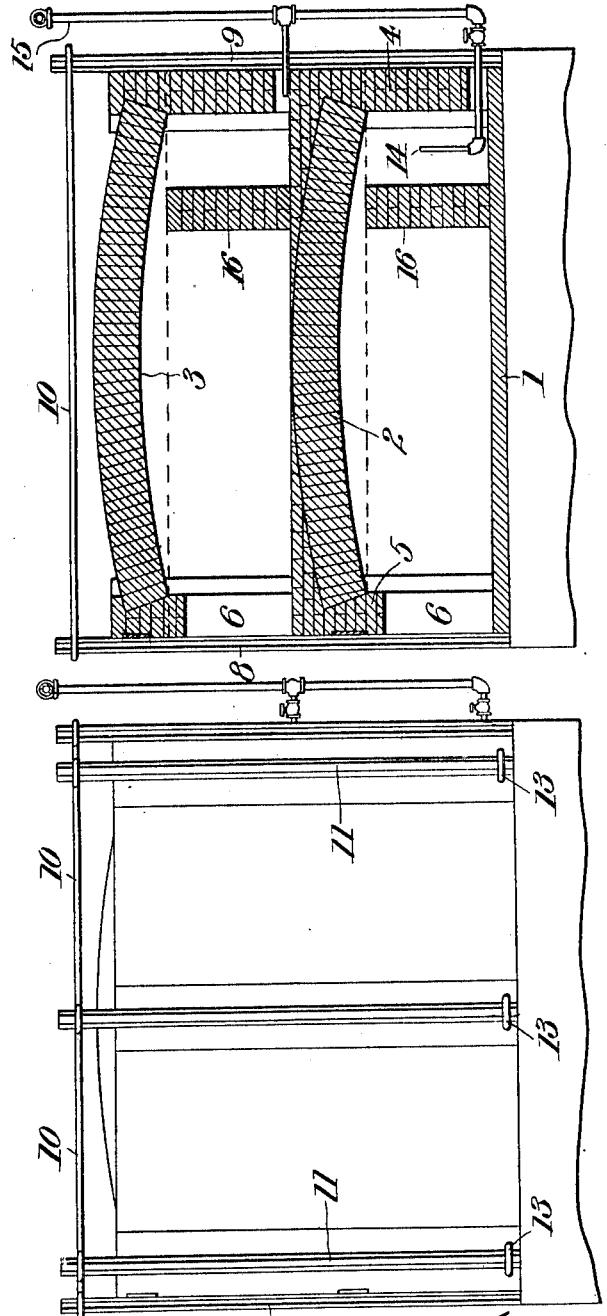

GEORGE S. HAMMITT, OF KANE, PENNSYLVANIA, ASSIGNOR OF ONE-HALF TO LAWRENCE A. GESSNER, OF KANE, PENNSYLVANIA.

GLASS REFINING AND SETTLING FURNACE.

1,117,565.    Specification of Letters Patent.    Patented Nov. 17, 1914.

Application filed April 28, 1910. Serial No. 558,261.

*To all whom it may concern:*

Be it known that I, GEORGE S. HAMMITT, a citizen of the United States, residing at Kane, in the county of McKean and State of Pennsylvania, have invented certain new and useful Improvements in Glass Refining and Settling Furnaces, of which the following is a specification.

This invention relates to glass refining and settling furnaces.

The object of the invention is to improve the construction of such structures in a manner that will insure them from becoming distorted from the application of heat used in treating the glass; to improve the manner of applying the heating medium to the glass, and materially to facilitate the handling of the glass pots.

With the above objects in view the furnace includes upper and lower ovens, the roof of the lower oven constituting the floor of the upper oven, and means for discharging fuel into the upper oven above the floor thereof. Therefore means is provided for internally heating the upper oven. The structure also includes means for leading fuel into the lower oven and adapted to discharge the same within the walls of the lower oven in the direction of the floor of the upper oven. This means not only supplies heat to the lower oven, but serves to heat the upper oven and the ascending heat from the lower oven tends to heat the upper oven externally. Consequently the upper oven is maintained at a higher temperature than the lower oven and the glass may first be warmed in the lower oven and then placed in the upper oven and completely heated.

In the accompanying drawings forming a part of this specification, and in which like characters of reference indicate corresponding parts: Figure 1 is a view in front elevation of a furnace constructed in accordance with the present invention, certain of the parts being omitted for clearness of illustration. Fig. 2 is an end view. Fig. 3 is a transverse sectional view.

As herein shown, the furnace is built with two tiers of ovens, but if preferred a greater number may be employed, and as this will be obvious, detailed illustration of any modification is omitted.

The furnace is provided with the usual floor 1 and with two arches 2 and 3, the latter forming the furnace-cap. These arches are supported by front and back walls 4 and 5, the latter of which is provided with openings or mouths 6, that are closed by double doors 7.

To prevent the front and back walls from warping or "kicking out", front and back stays 8 and 9 are employed, which are arranged at the front, between the oven doors, and are connected by stay-rods or hog chains 10 that are provided with suitable means for placing them under tension. At the ends of the furnace are back stays 11 that are connected by certain of the hog chains 10, and the lower ends of the front and back stays and end stays are held firmly combined with the furnace walls by anchors 12 and 13 respectively.

The means for heating the oven herein shown consists of burners 14 which connect with a service pipe 15 that leads to a suitable source of gaseous fuel, which may be either natural or manufactured gas, the former being preferred. While generally it will be of advantage to employ gaseous fuel, it is to be understood that where the same is not obtainable, coke, coal or wood may be employed in lieu thereof. One of the burners 14 is disposed horizontally to direct its flame against the deflecting wall 16 and the other is disposed vertically to direct its flame against the arch 2.

Arranged within each of the chambers, and adjacent to its rear wall, is a deflecting wall or septum 16 that extends upward in close proximity to the arches 2 and 3, and these serve as a means for directing the fuel downward into the glass pots, one of which is designated 17 in Fig. 1.

To facilitate handling of the glass pots the floors of the ovens will be covered with sand.

In operation, the pots are filled in the usual manner with any desired quantity of molten glass, and are then placed within the oven where by the application of a steady degree of heat, the glass is settled and refined, producing thereby a high grade and well-tempered product.

I claim:

A glass furnace comprising a lower and an upper oven, the roof of the lower oven constituting the floor of the upper oven, means for discharging fuel into the upper oven at one side and above the floor thereof, and means for leading fuel into the lower oven at one side thereof and adapted to discharge the same within the walls of the said oven in the direction of the floor of the upper oven, each oven having an opening, said openings being disconnected from each other and through which the products of combustion may escape from the ovens directly into the atmosphere and a wall located in each oven between the fuel discharging means and the opening, said walls terminating at their upper edges in the vicinity of the roofs of the respective ovens.

In testimony whereof I affix my signature in presence of two witnesses.

GEORGE S. HAMMITT.

Witnesses:
CHARLES OWENS,
WM. H. OWENS.

Copies of this patent may be obtained for five cents each, by addressing the "Commissioner of Patents, Washington, D. C."